(12) United States Patent
Smigerski et al.

(10) Patent No.: US 6,348,522 B1
(45) Date of Patent: Feb. 19, 2002

(54) PROCESS FOR THE CONTINUOUS PREPARATION OF RUBBER POWDERS AND A DEVICE FOR CARRYING OUT THE PROCESS

(75) Inventors: Hans-Jürgen Smigerski; Uwe Ernst, both of Marl (DE)

(73) Assignee: PKU Pulver Kautschuk Union GmbH, Marl (DE)

( * ) Notice: Subject to any disclaimer, the term of this patent is extended or adjusted under 35 U.S.C. 154(b) by 0 days.

(21) Appl. No.: 09/524,514

(22) Filed: Mar. 13, 2000

(30) Foreign Application Priority Data

Mar. 11, 1999 (EP) ............................................. 99104822

(51) Int. Cl.⁷ .................................................. C08K 3/00
(52) U.S. Cl. ........................ 523/340; 523/318; 523/324
(58) Field of Search .......................................... 523/340

(56) References Cited

U.S. PATENT DOCUMENTS

| 4,265,939 A | | 5/1981 | Tebbens et al. |
| 4,704,414 A | | 11/1987 | Kerner et al. |
| 4,798,314 A | * | 1/1989 | Worth ........................ 222/542 |
| 5,401,789 A | | 3/1995 | Wolff et al. |
| 6,040,364 A | * | 3/2000 | Mabry ........................ 523/318 |
| 6,123,762 A | | 9/2000 | Barthel et al. |

FOREIGN PATENT DOCUMENTS

| DE | 28 22 148 | 12/1979 |
| DE | 37 23 213 | 1/1989 |
| EP | 0 000 442 | 1/1971 |

OTHER PUBLICATIONS

English language abstract of PR above.
English language abstract of QR above.

* cited by examiner

*Primary Examiner*—Paul R. Michl
(74) *Attorney, Agent, or Firm*—Pillsbury Winthrop LLP

(57) ABSTRACT

A process for continuous preparation of filler-containing rubber powders including mixing a filler suspension and rubber latex in the liquid phase. The liquid mixture is passed through a tube, at least a coagulant is added to the tube and filler-containing rubber particles are precipitated. The liquid mixture is passed through at least one throttle position of variable throttle cross-section provided in the tube. The throttle cross-section is adjusted so that the drop in pressure in the liquid mixture achieved across the throttle position is greater than 0.5 bar.

12 Claims, 3 Drawing Sheets

PROCESS FOR THE CONTINUOUS PREPARATION OF RUBBER POWDERS AND A DEVICE FOR CARRYING OUT THE PROCESS

CROSS-REFERENCE TO RELATED APPLICATION

This application is based on European Application 99 104 822.4, filed Mar. 11, 1999, which disclosure is incorporated herein by reference.

FIELD OF THE INVENTION

The invention relates to a process for the continuous preparation of filler-containing rubber powders, in which a filler suspension and rubber suspension are mixed in the aqueous phase, the mixture is passed through a tube, at least a coagulant is added in the tube and filler-containing rubber particles are precipitated.

BACKGROUND OF THE INVENTION

According to the prior art, rubber mixtures are prepared from crude rubber in the form of balls with a high expenditure of time, energy and personnel. The comminution of the balls and mixing with additives are expensive and cost-intensive. On the other hand, the use of free-flowing rubber powders offers the possibility of preparing and processing rubber mixtures simply and quickly. U.S. Pat. 4,265,939 discloses a process for the continuous preparation of rubber powders, but no coagulant is mixed in a tube of relatively narrow cross-section. Effective mixing of the two components is said to take place in the narrow tube on the basis of the turbulent flow. The coagulated rubber material is then passed into a tube of widened cross-section. A polymer, as a coating composition, is fed to the liquid mixture in this tube. This known process leaves something to be desired with respect to effectively mixing the components. Furthermore, troublesome deposits or caking on the walls occur, especially in the tube section of narrowed cross-section, and these change the flow conditions. The properties of the products prepared by this process are therefore not reproducible and, because of the varying flow circumstances during the preparation these products also have disadvantageous undesirable properties. The fact that, in the context of a process for the continuous preparation of filler-containing rubber powders, the rubber material can be mixed continuously with the filler in a tube is also known in principle from DE 37 23 213 C2 and DE 37 23 214 C2. However, no fixed methodology for carrying out the process can be obtained from the two documents.

Processes for the preparation of filler-containing rubber powders which are operated batchwise or carried out discontinuously are furthermore known. In these, as a rule a filler-containing suspension is brought together with a suitable latex in the presence of a precipitant and the mixture is then allowed to react in a container. These known processes disadvantageously require a relatively high expenditure of apparatus and time. Such a discontinuous process is described, for example, in DE 28 22 148 C2.

SUMMARY OF THE INVENTION

In contrast, the invention is based on the object of providing a process for preparing a filler-containing rubber powder with reproducible properties, without problems and with a low expenditure, and to avoid the disadvantages described above.

The invention provides a process for the continuous preparation of a filler-containing rubber powder, in which
a) filler dispersions and rubber suspensions are mixed
b) the liquid mixture is passed through a tube, at least one coagulant is added and the filler-containing rubber powder is precipitated,
c) the liquid mixture is passed through a tube with at least one throttle position of variable throttle cross-section, and
d) the throttle cross-section is adjusted, with the proviso that the drop in pressure in the liquid mixture achieved with the throttle position is greater than 0.5 bar.

It lies within the context of the invention that the liquid mixture comprises at least one liquid medium, in particular water. Preferably, a suspension, expediently an aqueous suspension of the filler, is employed or added to the rubber material. A rubber latex and/or a rubber solution and/or an aqueous emulsion of a rubber solution is expediently employed as the rubber material. The rubber material may be a synthetic and/or naturally occurring rubber. According to a preferred embodiment of the invention, a styrene-butadiene copolymer is used as the rubber latex. Further, according to the invention, one or more fillers may be used. Carbon black, for example, may be used as the filler. In one embodiment of the invention, an aqueous suspension of carbon black is added to the rubber material, in particular a 2 to 7 wt. % aqueous suspension of carbon black is added to the rubber material.

The particle size range of the rubber powders obtained according to the invention is in general between 0.05 and 10 mm, in particular between 0.5 and 2 mm.

The pulverulent rubbers comprise 20 to 250 phr, in particular 50 to 100 phr of filler (phr: parts per hundred parts of rubber), and have optionally been modified partly or completely on the surface before the process according to the invention takes place, using the organosilicon compounds according to the formulae (I), (II) or (III), shown below, known in the rubber art. The following species, individually or as a mixture with one another, have been found to be suitable types of rubber for use in the invention: natural rubber, emulsion SBR with a styrene content of 10 to 50%, butyl-acrylonitrile rubber. Butyl rubbers, terpolymers of ethylene, propylene (EPM) and non-conjugated dienes (EPDM), butadiene rubbers, SBR, prepared by the solution polymerization process, with styrene contents of 10 to 25%, and contents of 1,2-vinyl constituents of 20 to 55% and isoprene rubbers, in particular 3,4-polyisoprene are useful in the invention.

In addition to the rubbers mentioned, the following elastomers may be used, individually or as a mixture: carboxyl rubbers, epoxide rubbers, trans-polypentenamer, halogenated butyl rubbers, rubbers of 2-chloro-butadiene, ethylene/vinyl acetate copolymers, epichlorohydrins, optionally also chemically modified natural rubber, such as, for example, epoxidized types. Fillers which are additionally used are in general the carbon blacks and white fillers of a synthetic nature, such as e. g. precipitated silicas, or naturally occurring fillers, such as e. g. siliceous chalk, clays etc., known from rubber processing.

Carbon blacks such as are generally employed in rubber processing are particularly suitable.

These include furnace blacks, gas and flame blacks with an iodine adsorption number of 5 to 1000 $m^2/g$, a CTAB number of 15 to 600 $M^2/g$, a DBP adsorption of 30 to 400 ml/100 g and a DBP number of 50 to 370 ml/100 g, in an amount of 5 to 250 parts, in particular 20 to 150 parts per 100 parts of rubber, in particular 40 to 100 parts.

The silicate fillers of synthetic or natural origin known from the rubber art, in particular precipitated silicas, are likewise suitable.

In general, these have an $N_2$ surface area, determined by the known BET method, of 35 to 700 m$^2$/g, a CTAB surface area of 30 to 500 m$^2$/g, and a DBP number of 150 to 400 ml/100 g. The product according to the invention comprises these silicas in an amount of 5 to 250 parts, in particular 20 to 100 parts, based on 100 parts of rubber.

If the fillers are white, naturally occurring fillers, such as clays or siliceous chalks with an $N_2$ surface area of 2 to 35 m$^2$/g, these are employed in an amount of 5 to 350 parts, based on 100 parts of rubber.

Powders which comprise one or more of the abovementioned fillers in a mixture are also suitable.

In addition to the non-modified fillers of the type mentioned, modified fillers are optionally additionally employed in the preparation of the rubber powders described herein. The content of non-modified fillers depends on the mixture specifically to be prepared. In all cases, the total amount of filler amounts to 20 to 250 phr. This in general comprises the non-modified fillers: silica and/or carbon black to the extent of 100% in particular to the extent of 30 to 100%, preferably 60 to 100%. Organosilicon compounds which are employed for the modification of the surfaces are in general those of the general formulae

   (I),

   (II), or

   (III), in which the symbols denote $B^1$: —SCN, —SH, —Cl, —NH$_2$ (if q=1) or —SX— (if q=2)

R and $R^1$: an alkyl group having 1 to 4 carbon atoms, branched or unbranched, the phenyl radical, where all the radicals R and $R^1$ in each case can have the same or a different meaning, preferably an alkyl group, R: a $C_1$–$C_4$-alkyl, -$C_1$–$C_4$-alkoxy group, branched or unbranched, n: 0; 1 or 2, Alk: a divalent straight-chain or branched carbon radical having 1 to 6 carbon atoms, m: 0 or 1

Ar: an arylene radical having 6 to 12 C atoms p: 0 or 1, with the proviso that p and m do not simultaneously denote 0, x: a number from 2 to 8, alkyl: a monovalent straight-chain or branched unsaturated hydrocarbon radical having 1 to 20 carbon atoms, preferably 2 to 8 carbon atoms, alkenyl: a monovalent straight-chain or branched unsaturated hydrocarbon radical having 2 to 20 carbon atoms, preferably 2 to 8 carbon atoms.

Modified fillers which are employed according to the invention are described e.g. in EP-B 0442 143, EP-B 0177 674, and in particular in the form of granules in EP-A 0795 579 (white fillers), or in EP-B 0519 188 (carbon black).

The bis(alkoxysilylalkyl)-oligosulfanes of the types bis (trialkoxysilylpropyl)-tetrasulfane and -disulfane have proved to be particularly suitable for the pre-modification or the addition to the filler suspension.

The modified fillers known from the patent applications or patents mentioned above and the organosilicon compounds mentioned there are expressly also included in the present application as a constituent of the compositions of the inventions.

In addition to the fillers already mentioned, the rubber powders according to the invention preferably comprise known processing or vulcanization auxiliary substances, such as zinc oxide, zinc stearate, stearic acid, polyalcohols, polyamines, resins, waxes, plasticizer oils, anti-aging agents against heat, light or oxygen and ozone, reinforcing resins, flameproofing agents, such as e. g. Al(OH)$_3$ and Mg(OH)$_2$, pigments, various crosslinking chemicals and accelerators and optionally sulfur in the concentrations conventional in rubber technology, preferably sulfur in modifications to which surface-active substances have been added such as are commercially available.

The particle size is determined from the filler suspension.

In a particularly preferred embodiment of the process according to the invention, all the solids employed are present in a particle size of <50 μm, preferably <10 μm, before precipitation of the rubber particles out of the suspension. The formation of agglomerates may optionally occur during the preparation, but these agglomerates do not adversely influence the processing properties.

The invention also provides a process for the preparation of finely divided, filler-containing rubber powders by precipitation, in a tube provided with throttle flaps at a suitable position, from aqueous mixtures which contain finely divided filler(s) optionally modified with organosilicon compounds, (carbon black and/or silicate filler) water-soluble salts of a metal of Groups IIa, IIb, IIIa and VIII of the Periodic Table of Elements and a rubber latex or an aqueous emulsion of a rubber solution, optionally in the presence of an organic solvent, which is characterized in that a) ≧50 wt. %, but less than 100 wt. %, of the envisaged amount of the finely divided filler, preferably in the form of an aqueous suspension with a content of 2 to 15 wt. % in water, optionally with one of the amount envisaged for the modification of the filler surface of one or more of the organosilicon compounds according to the formulae (I), (II) or (III) in an amount of 0.1 to 20 wt. %, based on the filler, in particular if it is a silicate filler, preferably precipitated silica, and/or ≧50 wt. %, but less than 100 wt. %, of a filler which is at least partly modified on the surface with one or more of the organosilicon compounds (formulae (I), (II) or III), are mixed, preferably in the presence of an emulsifier, with a rubber latex or an aqueous emulsion of a rubber solution and the pH of the mixture is reduced to a value in the range of 7.5 to 6.5, preferably by addition of a Lewis acid, (first stage), b) the remaining content of the abovementioned finely divided fillers, optionally together with the residual amount envisaged for modification of the filler surface of organosilicon compounds of the formulae (I), (II) or (III), is added in the form of a suspension, the pH is reduced, preferably by addition of a Lewis acid, to a value in the range of <6.5 to ~5, preferably ~5.5, so that the rubber in the mixture precipitates completely together with the filler (second stage), c) the solid which has precipitated is separated off by measures known per se, d) and is optionally washed and e) dried.

The organosilicon compounds are employed in particular if silicate fillers, preferably silicas, are used.

The precipitation process is in general carried out at room temperature, in particular at 20° to 80° C., in the tube, which is preferably provided with several input positions.

The process is carried out by adaptation of the methods known from DE 198 58 706.6.

In the process of the invention, the tube is preferably a tube of circular cross-section. The tube diameter is, for example, 10 to 30 mm. The total tube length is preferably 1 to 3 m, more preferably 1.5 to 2.5 m.

According to the invention, the tube cross-section is reduced at least at one throttle position. Preferably, the diameter of the tube before the throttle position is the same as the diameter of the tube after the throttle position. The invention also optionally provides an adjustable throttle control located at the throttle position. The throttle control is preferably a valve, more preferably a squeeze valve with an elastic insert. According to a preferred embodiment of the invention, the throttle control, of which there is at least one, is set or adjusted with the aid of a drive device. The purpose of the variable reduction in the cross-section at the throttle position is to allow the continuous process always to be conducted such that the drop in pressure achieved at the throttle position is greater than 0.5 bar. In other words, the throttle cross-section is expediently always adjusted with the adjustable throttle control during the continuous process procedure such that the pressure before the throttle position or before the throttle control is at least 0.5 bar higher than after the throttle position or after the throttle control. The drop in pressure in the liquid mixture achieved with the throttle position is not more than 6 bar. Preferably, a drop in pressure of 0.5 to 3 bar, more preferably 0.8 to 2.5 bar, is achieved at the throttle position. Because of the throttling, a surprisingly optimum mixing of the components passed through the throttle position is achieved. It lies within the context of the invention that the tube cross-section widens again in the direction of flow after a throttle position according to the invention.

According to another preferred embodiment, the throttle cross-section is varied during the continuous process procedure in order to remove deposits in the throttle region. Deposits in the throttle region mean, in particular, deposits or caking on the walls shortly before the throttle position and shortly after the throttle position and in the throttle control. Thus, if deposits or caking are found in the throttle region, the throttle cross-section is preferably varied as a function thereof. Regulation of the throttle cross-section is expediently automatic.

According to a further preferred embodiment, a constant drop in pressure is always maintained or set at the throttle position in the context of the process according to the invention. Thus, if the drop in pressure at the throttle position changes because of deposits or caking, the throttle cross-section is preferably readjusted until the desired constant drop in pressure is achieved again. A surprisingly effective mixing can thus be achieved for the components employed for the preparation of the finely divided rubber powder with the throttling according to the invention, so that end products with the desired properties can be prepared without problems. It is advantageous that deposits or caking which would disadvantageously change the flow circumstances can be prevented according to the invention in a simple manner and reproducible products can thus be obtained.

According to one embodiment of the invention, the liquid mixture of rubber latex and filler suspension is passed through a tube with a throttle position before addition of coagulant. In this embodiment, effective premixing of the rubber latex and filler takes place immediately after the throttle position. According to another embodiment of the invention, a liquid mixture of rubber latex, filler and coagulant is passed through one of the abovementioned throttle positions. It lies within the context of the invention to provide a first throttle position through which a liquid mixture of rubber material and filler suspension is passed, and thereafter to add coagulant, and only then to pass this liquid mixture through a second throttle position. Effective mixing of the rubber material, filler and coagulant takes place immediately after this second throttle position. According to a preferred embodiment of the invention, both the throttle cross-section of the first throttle position and the throttle cross-section of the second throttle position are adjusted such that the drop in pressure in the liquid mixture achieved with the particular throttle position is greater than 0.5 bar and not more than 6 bar.

According to a preferred embodiment, which is of particular importance in the context of the invention, precipitated rubber particles are coated with a coating composition. The coating composition is added to the coagulated rubber material. A filler for rubber is expediently employed as the coating composition. The filler which was already mixed with the rubber material at the start of the process can be employed here. However, another filler may be used.

According to another preferred embodiment of the invention, the liquid mixture with the added coating composition is passed through an additional throttle position in the tube. The drop in pressure at this throttle position is also expediently more than 0.5 bar and not more than 6 bar, preferably 3 bar.

According to a further preferred embodiment of the invention, the liquid mixture is passed through a total of three throttle positions in the tube. In this embodiment, the rubber material and filler are first mixed and passed through a first throttle position. In the subsequent section of the tube, the coagulant is added and the resulting liquid mixture is passed through a second throttle position. In the subsequent tube section, the precipitation of rubber particles takes place, and the coating composition is then added in this tube section. The mixture with the coating composition is then passed through a third throttle position. The drop in pressure at each of the three throttle positions is preferably more than 0.5 bar. At least two, preferably all three, throttle positions are expediently constructed as has been explained above for a first throttle position.

According to a second preferred embodiment, two throttle positions in total are provided in the tube. In this embodiment, the rubber material, filler and coagulant are first mixed and this liquid mixture is passed through the first throttle position. In the tube section after the first throttle position, the precipitation of the rubber particles then takes place, and the coating composition is subsequently added. The mixture with the coating composition is then passed through a second throttle position. The throttle cross-section at each of the two throttle positions is preferably adjusted with the proviso that the drop in pressure in the liquid mixture achieved with the particular throttle position is greater than 0.5 bar and not more than 6 bar. The two throttle positions are expediently constructed as has been explained above for a first throttle position.

The invention also provides a device for carrying out the process according to the invention.

The invention is based on the finding that a filler-containing rubber powder with reproducible properties can be obtained in a manner which is not particularly expensive if the continuous procedure according to the invention is used. A surprisingly effective mixing of the components employed here (rubber material, filler, optionally coagulant) is achieved using the throttle positions according to the invention, so that thereafter the desired reaction proceeds completely and without problems. In the case of the components used here, in particular, trouble-free mixing is generally problematic, for example, in achieving a completely homogeneous embedding of the filler in the rubber. With the variable throttling according to the invention, this mixing is achieved in a manner which, to the expert, is surprisingly effective and functionally reliable. A specific turbulent flow is generated with the aid of the throttle controls, preferably throttle valves, because of the drop in pressure according to the invention and, as a result, a very homogeneous mixture is achieved, so that homogeneous end products also result. This was not possible with the known processes described above. In addition to optimum mixing of the components, as a result of the throttling according to the invention, deposits or caking in the region of the throttle position can furthermore be avoided surprisingly effectively by changing the throttle cross-section. By regulating the pressure loss with the aid of variable throttle cross-sections, throttle positions which are insensitive to blocking and function as optimum mixing controls are thus obtained according to the invention. Pulverulent rubbers which can already comprise all the rubber auxiliary substances can be prepared by the process according to the invention. In addition to fillers, these auxiliary substances are, for example, sulfur, vulcanization accelerators, activators and rubber anti-aging agents. These rubber auxiliary substances can be added to the liquid mixture without problems during the continuous process procedure, and these rubber auxiliary substances are then present in the pulverulent end products in a very homogeneous distribution. In contrast to known processes, after-treatments, in particular coating of the rubber particles, are also possible in a simple manner in that a further throttle control is provided according to the invention and the drop in pressure established at this throttle control contributes towards effective mixing also of the coating composition with the liquid mixture and thus functionally reliable and uniform coating of the rubber particles. With the continuous procedure in the tube according to the invention, considerably higher yields per unit time are achieved compared with a discontinuous procedure. The residence times of the liquid mixture in the tube according to the invention are relatively short.

BRIEF DESCRIPTION OF THE DRAWINGS

The invention is explained in more detail below with the aid of figures which show examples of the invention. The figures show.

DETAILED DESCRIPTION OF THE PREFERRED EMBODIMENT

Figure 1:
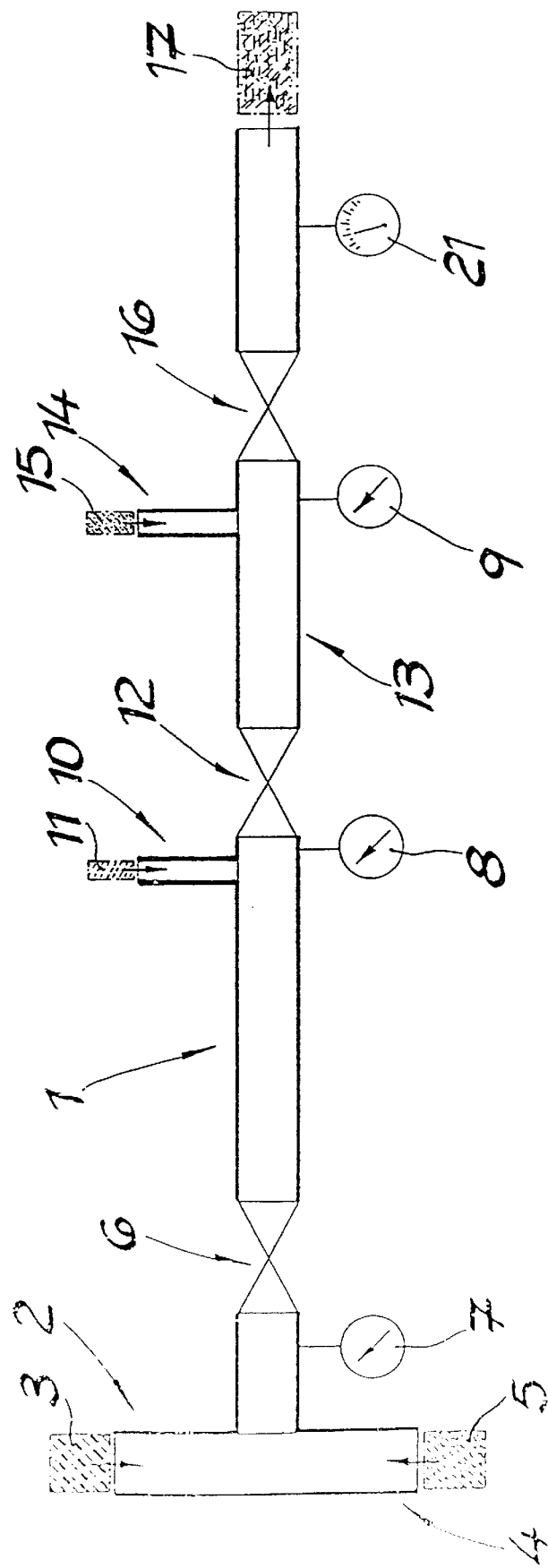
FIG. 1 a schematic view of a device for carrying out the process according to the invention, FIG. 2 a diagram of the device according to FIG. 1, in which the pressure is shown schematically as a function of the tube length or of the residence time in the tube and FIG. 3 a schematic view of a further device for carrying out the process of the invention.
Figure 3:
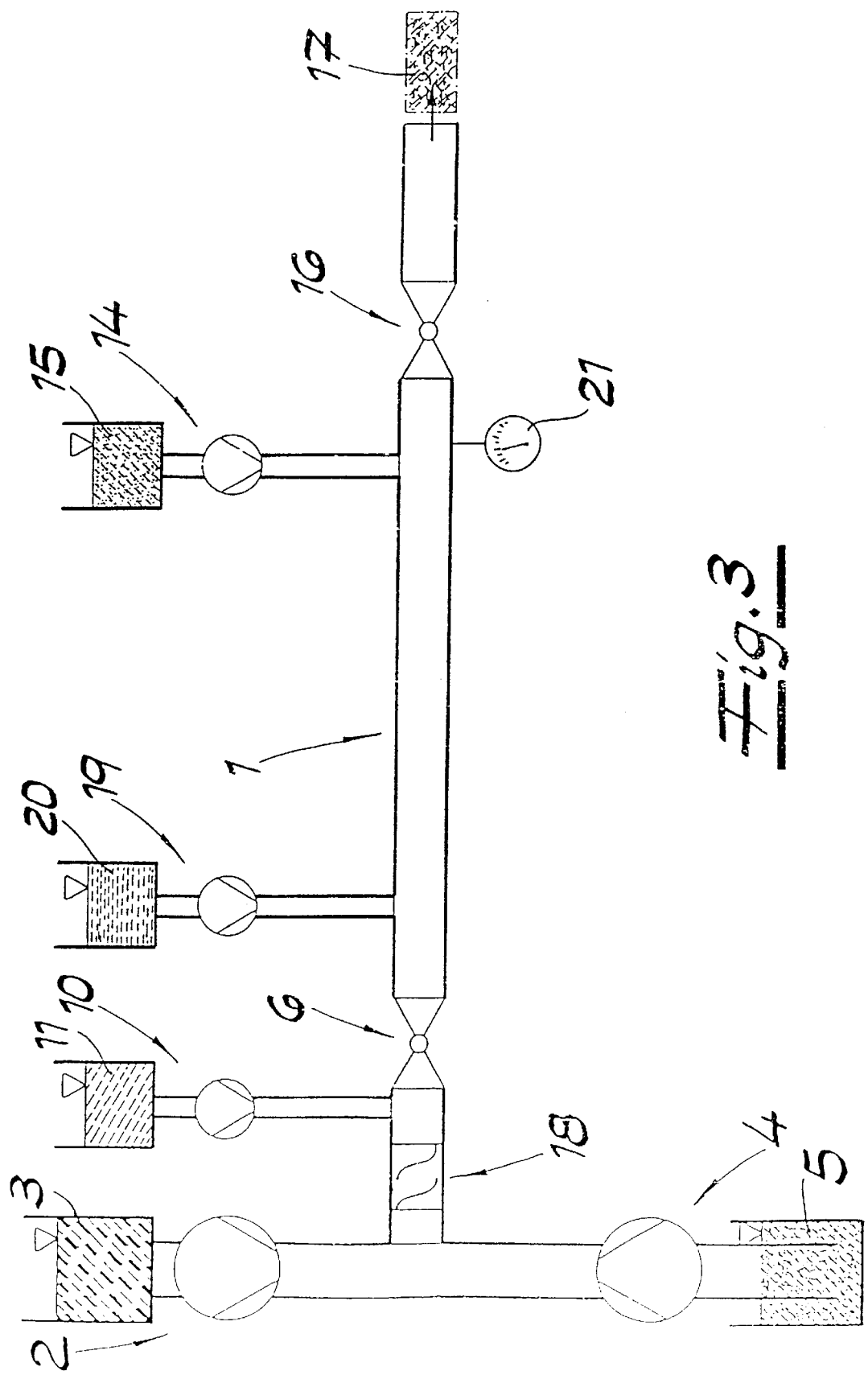

FIGS. 1 and 3 show devices for the continuous preparation of a filler-containing rubber powder in which like numerals denote like parts. The devices comprise a tube 1 through which a rubber-containing liquid mixture passes and in which rubber particles are precipitated. A feed device 2 for rubber material 3 and a feed device 4 for filler 5 are connected at the input end of the tube 1. The rubber material may be a rubber latex, preferably a styrene/butadiene latex. The filler is an aqueous suspension of carbon black.

In the embodiment according to FIG. 1, the liquid mixture of rubber material 3 and filler 5 is first passed through the first throttle control 6. The throttle cross-section of this first throttle control 6 is always adjusted such that the drop in pressure in the liquid mixture achieved at the throttle position is greater than 0.5 bar. Pressure sensors, not shown in the Figures are provided. In the embodiment according to FIG. 1, the particular pressure conditions which exist in the individual tube sections can be read off via pressure gauges 7, 8, 9. The process is preferably carried out such that a constant drop in pressure always remains established at the first throttle control 6 during the continuous process procedure. The throttle cross-section is expediently always readjusted such that this constant drop in pressure exists. According to a preferred embodiment, the readjustment of the first throttle control 6 takes place automatically. In one embodiment, the first throttle control 6 may be constructed as a squeeze valve. Preferably, and as shown in the embodiment example according to FIG. 1, the tube section before the first throttle control 6 has the same cross-section as the tube section after the first throttle control 6. A particularly effective mixing of the rubber material with the filler takes place due to the throttling at the first throttle control 6.

Coagulant 11 is added to the liquid mixture in the tube 1 via a feed device 10. This liquid mixture is then passed through a second throttle control 12, the throttle cross-section of which is adjusted such that the drop in pressure in the liquid mixture achieved at this throttle position is greater than 0.5 bar. With this second throttle control 12 also, the throttle cross-section is expediently always adjusted during the process such that a constant drop in pressure exists. Preferably, this second throttle control 12 is also readjusted automatically as a function of the drop in pressure measured. Preferably and in the embodiment example, the tube diameter before the second throttle control 12 corresponds to the tube diameter after the second throttle control 12. After the second throttle control 12, the coagulant 11 is mixed surprisingly effectively with the liquid mixture. In the tube section 13 after the second throttle control 12, the intensively mixed reactants then react and the rubber particles precipitate here.

Preferably and in the embodiment example according to FIG. 1, a further feed device 14 for a coating composition 15 is provided. In one example, the coating composition 15 may correspond to the filler 5. The previously precipitated rubber particles are to be coated with this coating composition 15. In the embodiment according to FIG. 1, the liquid mixture with the coating composition 15 is passed through an additional throttle control 16. In this additional throttle control 16 also, the throttle cross-section is adjusted with the proviso that the drop in pressure in the liquid mixture achieved with the throttle position is greater than 0.5 bar. Preferably, a constant drop in pressure is also always established here, and as in the case of the throttle controls 6, 12 described above, this drop in pressure is preferably readjusted automatically. The tube diameter before the additional throttle control 16 expediently corresponds to the tube diameter after the additional throttle control 16. After the additional throttle control 16, the coating composition is mixed surprisingly effectively with the liquid mixture. In the tube section after the additional throttle control 16, coating of the rubber particles then takes place. The precipitation product 17 is taken off at the end of the tube in the form of coated rubber particles. Separation of the coated filler-containing rubber particles from the liquid phase or from the aqueous phase then expediently takes place, and drying of the rubber particles is then preferably carried out. A finely divided rubber powder with reproducible properties is obtained.

Figure 2:
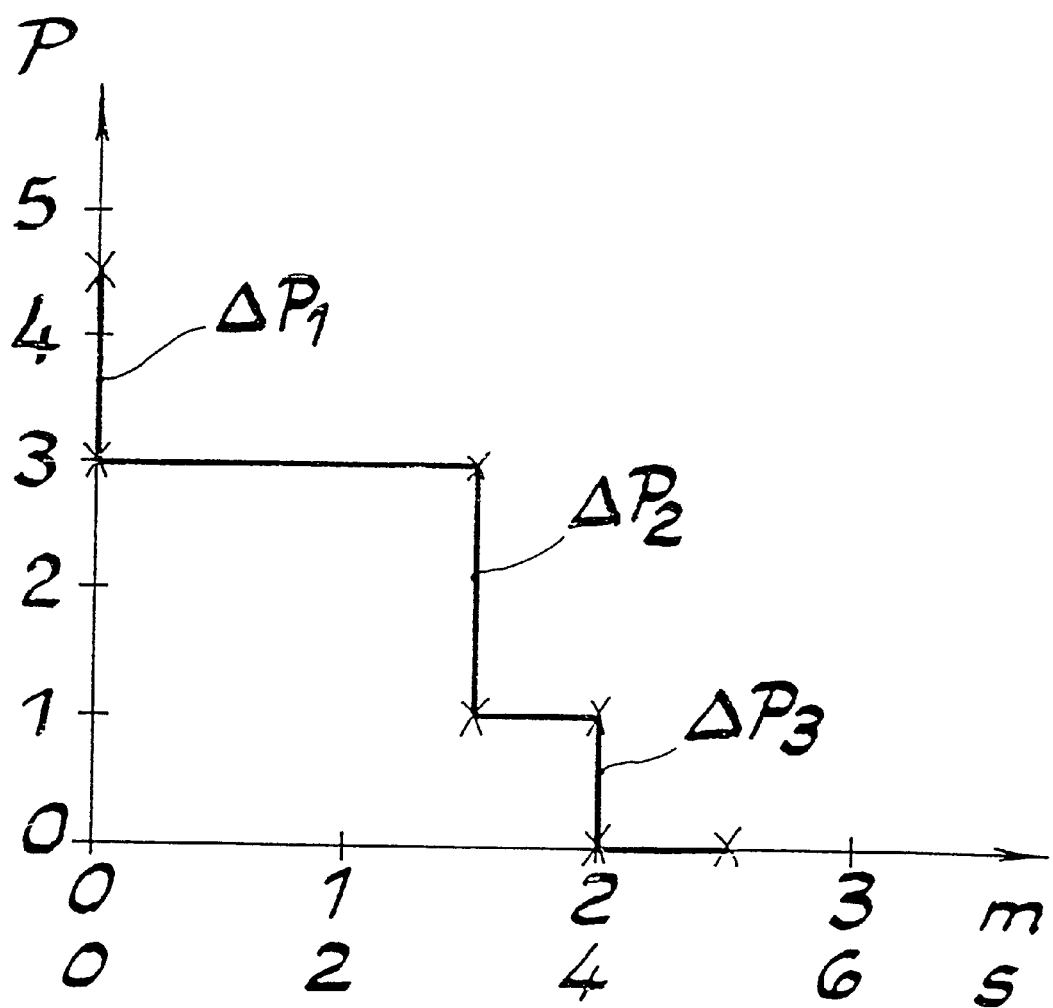

In FIG. 2, for a device according to FIG. 1, the pressure P in the tube 1 is plotted against the tube length (in meters) and against the residence time of the liquid mixture in the tube (in seconds). The tube length is measured from the first throttle control 6. According to FIG. 2, a tube with a length of 2.5 m (measured from the first throttle control 6) is employed in the embodiment example. The tube diameter is 25 mm in the embodiment example. The diagram according to FIG. 2 shows that the drop in pressure $\Delta P_1$ at the first throttle control 6 is 1.5 bar. The drop in pressure $\Delta P_2$ at the second throttle control 12 is 2 bar in the embodiment example, and the drop in pressure $\Delta P_3$ at the additional throttle control 16 is 1 bar. Overall, the pressure of the liquid mixture in the tube 1 has thus fallen from an initial pressure of 4.5 bar to 0 bar in this embodiment example. The maximum initial pressure is preferably 6 bar. According to a preferred embodiment, the drop in pressure $\Delta P$, at the first throttle control 6 is 0.5 to 2.5 bar, preferably 1 to 2 bar. Preferably, the drop in pressure $\Delta P_2$ at the second throttle control 12 is 0.5 to 3 bar, preferably 1.5 to 2.5 bar. The drop in pressure $\Delta P_3$ at the additional throttle control 16 is expediently 0.5 to 2 bar, preferably 0.5 to 1.5 bar.

FIG. 3 shows a further embodiment of a device according to the invention. Rubber material 3 in the form of a 20 wt. % latex of styrene/butadiene copolymer is input via the feed device 2. Filler 5 in the form of a 3 wt. % aqueous carbon black suspension is fed to the tube 1 via the feed device 4. For premixing of the rubber material 3 with the filler 5, the liquid mixture is first passed through a baffle plate arrangement 18, and thereafter coagulant 11 in the form of a 20 wt. % aluminium sulfate solution is fed to the tube 1 via the feed device 10. The liquid mixture with the coagulant is then passed through a first throttle control 6. The throttle cross-section of this first throttle control 6 is adjusted such that the drop in pressure achieved in the liquid mixture is greater than 0.5 bar. A very effective mixing of the rubber material, filler and coagulant takes place after the first throttle control 6. Acid 20, preferably a 10 wt. % sulfuric acid solution, is fed to the tube 1 via the feed device 19. A pH of between 1 and 10 is established here, preferably a pH of between 2.5 and 9. A pH of greater than 6 is more preferable. The pH can be checked with the pH meter 21. The size of the coagulated or filler-containing rubber particles can be controlled by the pH adjustment. In the tube section in the direction of flow after the feed device 19, precipitation of the rubber particles then takes place. Coating composition 15 is input via feed device 14. The liquid mixture with the coating composition 15 is then passed through the additional throttle control 16. A very effective mixing and therefore an effective coating of the rubber particles takes place after the additional throttle control 16. Thereafter, the finished precipitation product 17 is taken off in the form of coated finely divided rubber particles present in the aqueous phase. The rubber particles are then separated from the aqueous phase and the rubber powder is subsequently preferably dried.

In the embodiment exemplified in FIG. 3, the total tube length is 1.5 m. The tube section between the feed devices 2 and 4 and the first throttle control 6 has a length of 0.25 m. The length of the tube section between the first throttle control 6 and the additional throttle control 16 is 1.0 m, and the tube section after the additional throttle control 16 has a length of 0.25 m. The diameter of the tube 1 outside the throttle controls 6, 16 is 15 mm.

What is claimed is:

1. A process for continuous preparation of filler-containing rubber powder from a liquid mixture of aqueous filler dispersions and rubber latices, comprising
    a) passing liquid mixture through a tube;
    b) adding a coagulant to the liquid mixture;
        wherein the tube comprises at least one throttle position of variable throttle cross-section and optionally one or more inlet positions; and
    c) adjusting the throttle cross-section, wherein the drop in pressure in the liquid mixture across the throttle position is greater than 0.5 bar.

2. The process according to claim 1, further comprising varying the throttle cross-section during the process to remove deposits in a region of the throttle.

3. The process according to claim 1, wherein the liquid mixture comprises rubber latex and filler is passed through a said throttle position before addition of a coagulant.

4. The process according to claim 1, wherein a liquid mixture of rubber latex, filler and coagulant is passed through a said throttle position.

5. The process according to claim 1, wherein rubber particles are precipitated, and the precipitated rubber particles are coated with a coating composition.

6. Process according to claim 5, wherein the liquid mixture including the coating composition is passed through an additional throttle position in the tube.

7. A process for the continuous preparation of a filler-containing rubber powder from a liquid mixture of aqueous filler dispersions and rubber latices, comprising:
    (a) passing said liquid mixture through a tube of circular cross-section, said tube comprising at least one throttle position, wherein said circular cross-section is reduced in area and then returns to its original value so that the cross-sectional area of said tube is essentially the same before and after said throttle position;
    (b) adding a coagulant to the liquid mixture; and
    (c) adjusting the throttle cross-section so that the drop in pressure in said liquid mixture across the throttle position is greater than 0.5 bar.

8. The process of claim 7, further comprising varying the throttle cross-section during the process to remove deposits in the throttle region.

9. The process of claim 7, wherein said liquid mixture comprises rubber latex and filler and is passed through said throttle position before the addition of a coagulant.

10. The process of claim 7, wherein a liquid mixture of rubber latex, filler and coagulant is passed through said throttle position.

11. The process of claim 7, wherein rubber particles are precipitated and the precipitated rubber particles are coated with a coating composition.

12. The process of claim 11, wherein said liquid mixture containing said coating composition is passed through an additional throttle position in said tube.

* * * * *